Aug. 22, 1933.   J. F. DRUMMOND   1,923,478
VENDING MACHINE
Filed Sept. 22, 1930   7 Sheets-Sheet 1

Inventor

Joseph F. Drummond,

By Cushman Bryant & Darby
Attorneys

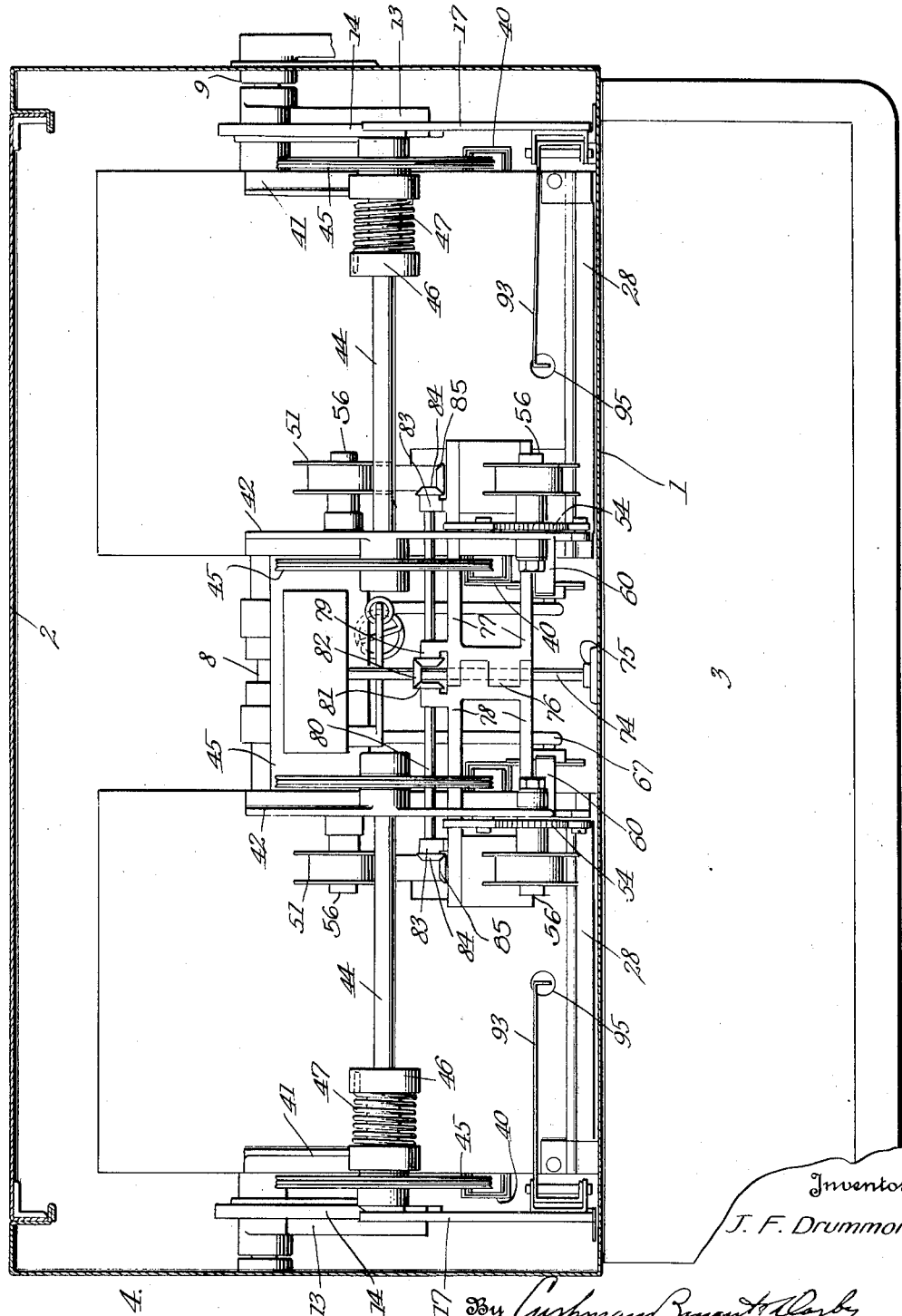

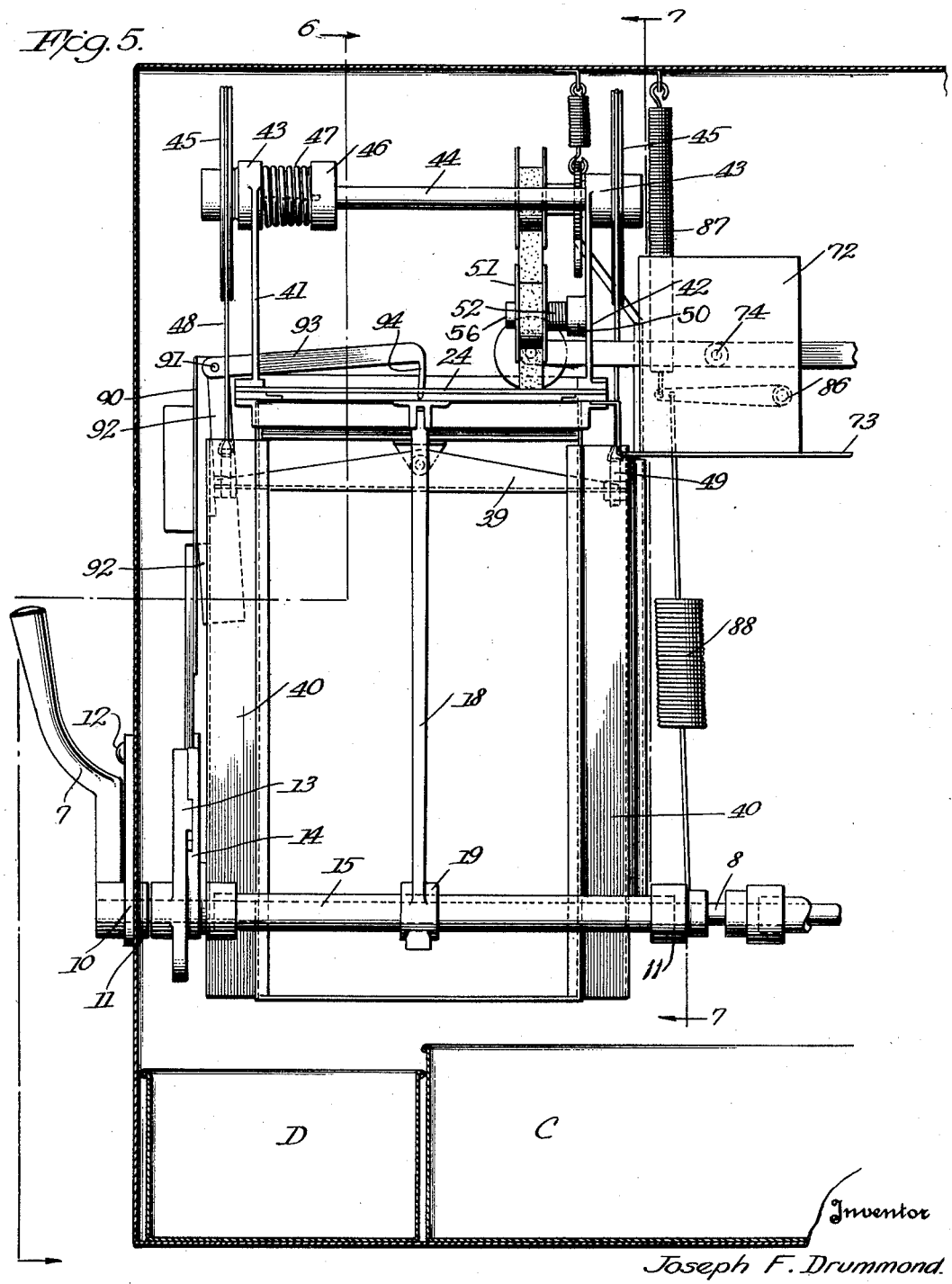

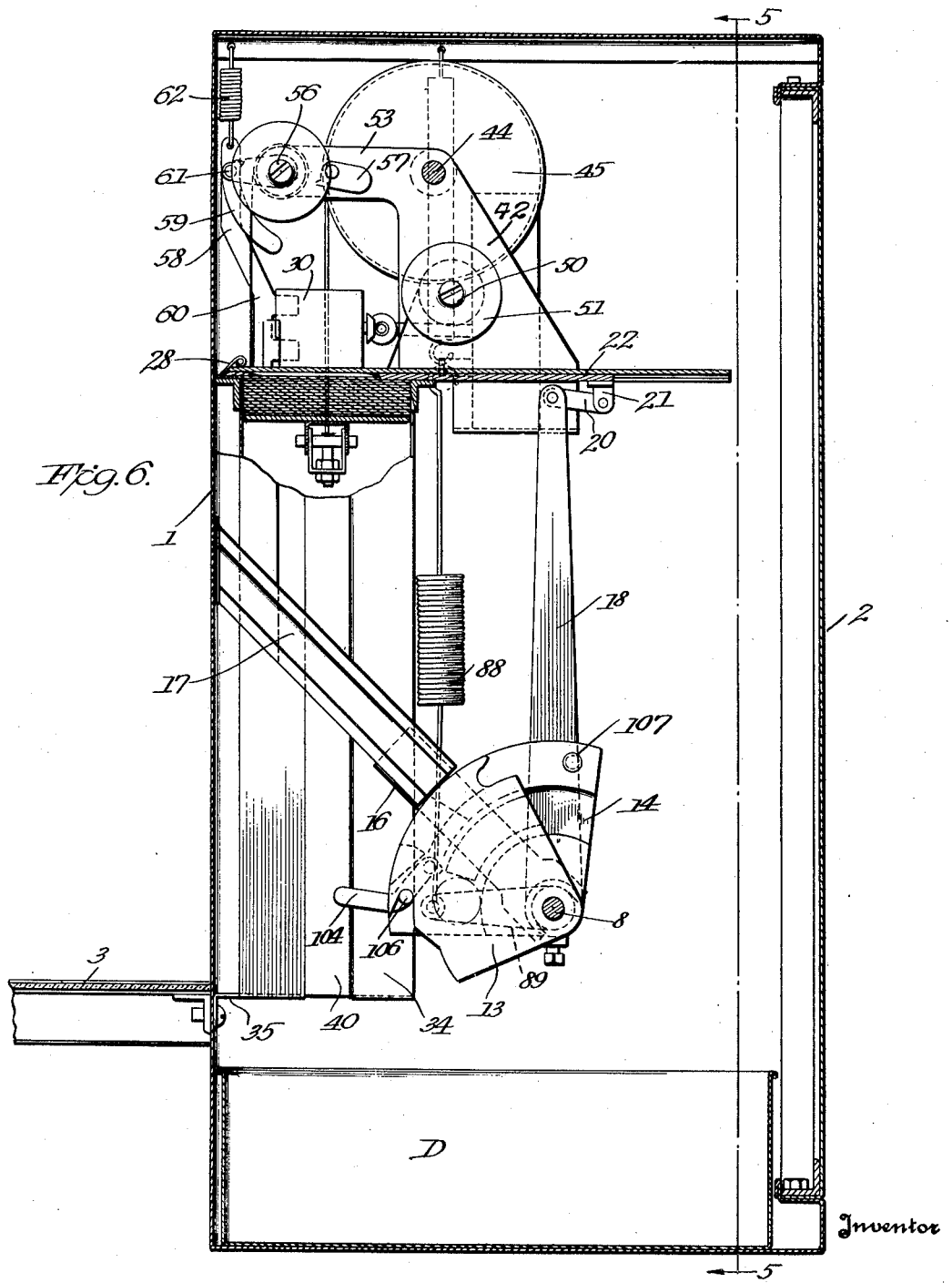

Aug. 22, 1933.   J. F. DRUMMOND   1,923,478
VENDING MACHINE
Filed Sept. 22, 1930   7 Sheets-Sheet 5
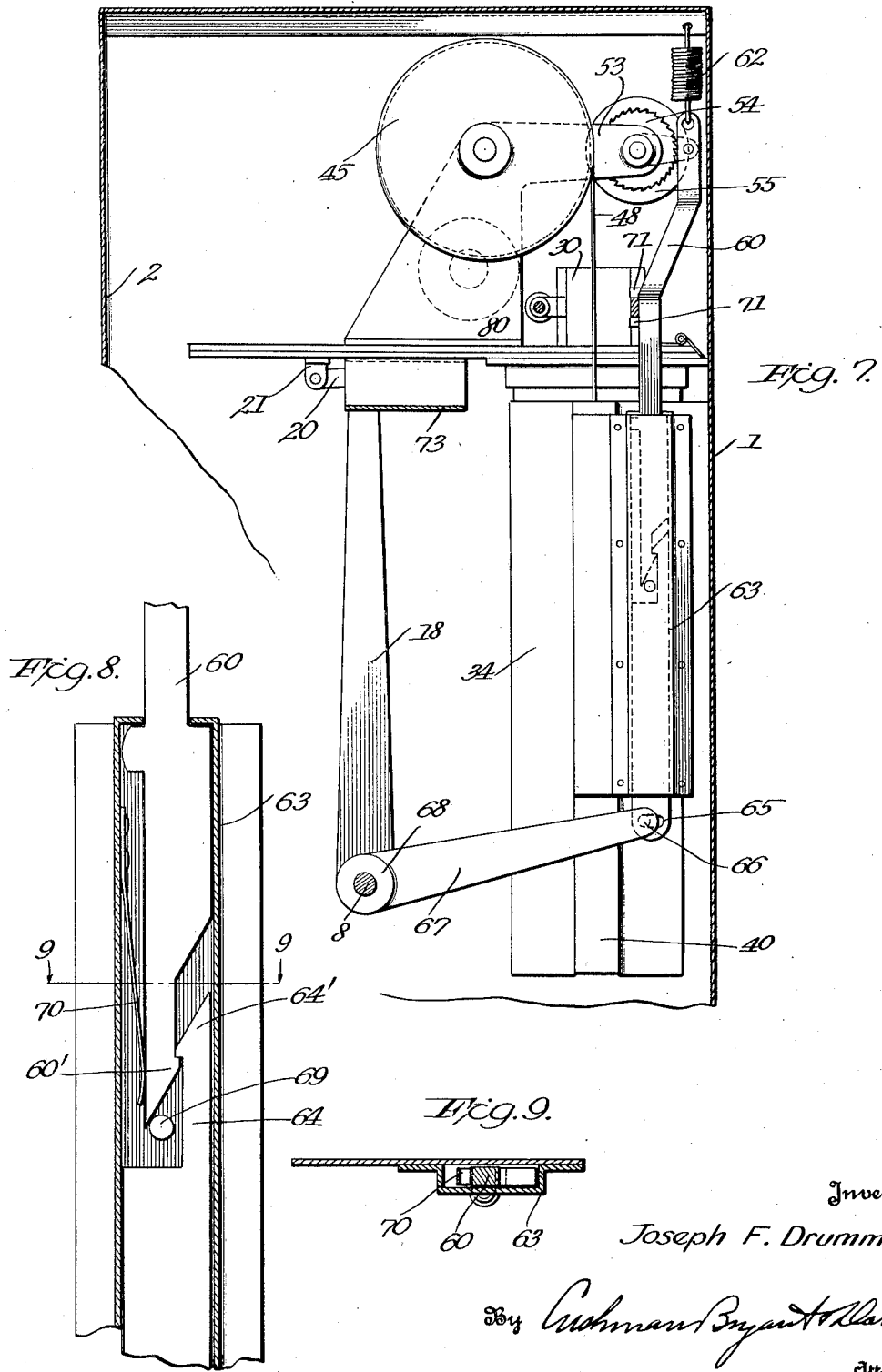
Inventor
Joseph F. Drummond.
By Cushman Bryant & Darby
Attorneys Aug. 22, 1933.  J. F. DRUMMOND  1,923,478
VENDING MACHINE
Filed Sept. 22, 1930   7 Sheets-Sheet 6
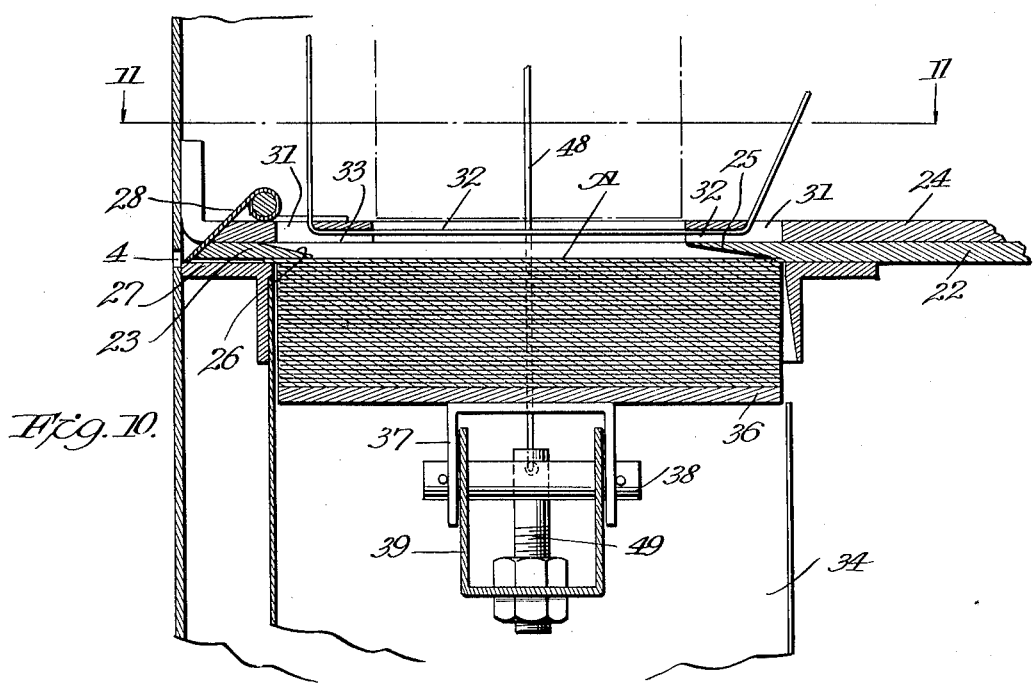
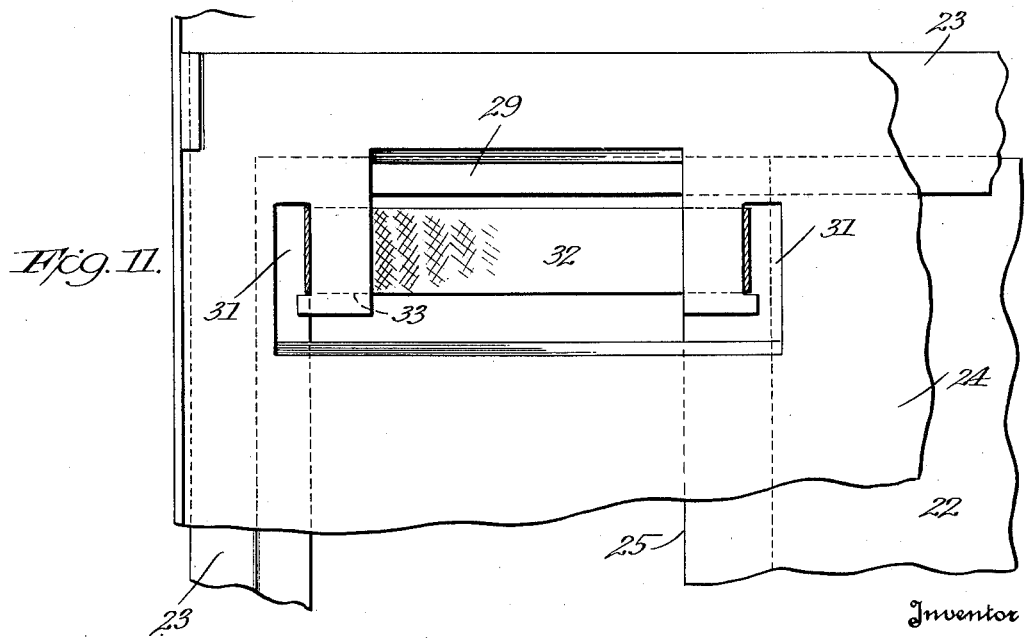
Inventor
Joseph F. Drummond
By Cushman Bryant & Darby
Attorneys Aug. 22, 1933.  J. F. DRUMMOND  1,923,478
VENDING MACHINE
Filed Sept. 22, 1930  7 Sheets-Sheet 7

Inventor
Joseph F. Drummond
By Cushman, Bryant & Darby
Attorneys

Patented Aug. 22, 1933

1,923,478

UNITED STATES PATENT OFFICE 1,923,478

VENDING MACHINE

Joseph F. Drummond, Norfolk, Va.

Application September 22, 1930
Serial No. 483,694

13 Claims. (Cl. 101—318)

This invention relates to a vending machine, and more particularly to that type of machine where a certificate, card, or receipt is issued upon the deposit of a stipulated amount or premium.

In order to fully illustrate the purposes and functions of the vending machine, I am, in this instance, applying the device to the issuance of insurance premium certificates or receipts, which indicate that application has been made and accepted for protection under the provisions of an insurance policy, particularly that type known as "accident insurance", commonly sold at railroad, motor bus, and other terminals to travelers.

It is to the mutual benefit of those travelling and of the common carriers that the acquiring of accident insurance be encouraged. While it is quite generally known to the public that such service can be procured at points of travel departure, such fact is not sufficiently obvious to attract the attention of the average person who might otherwise be desirous of insurance protection, and such service is not obtainable at places convenient to those traveling in private automobiles, or places where unusual hazards exist.

In order to more satisfactorily accomplish this result, it is necessary to eliminate the human equation in the present insurance selling agency, and institute a selling agency which will remind potential purchasers that accident insurance protection is available, and can be procured by the payment of a nomimal premium. Heretofore, I am aware, there have been machines for vending insurance premium certificates, but due to inefficient and complicated mechanism and to the lack of fool-proof qualities of said machines, they have either failed to attract or have fallen into disfavor with prosepctive purchasers.

It is one of the objects of the present invention to provide a vending machine, which is extremely simple in construction, but yet highly efficient in operation.

Another object of the invention is to provide a vending machine which is absolutely fool-proof.

Still another object of the invention is to provide a vending machine, which is not, in the least, cumbersome, but may be positioned in all advantageous places and form an attractive sales appeal to the public.

With these and other objects and advantages in view, attention is called to the drawings in which:

Figure 4 is a plan view of the vending machine mechanism;

Figure 5 is a back view of the vending machine mechanism taken on the line 5—5 of Figure 6;

Figure 6 is a side view of the vending machine mechanism taken on the line 6—6 of Figure 5;

Figure 7 is a side view of the vending machine taken on the line 7—7 of Figure 5;

Figure 8 is an enlarged side view of the trip releasing mechanism;

Figure 9 is a plan view of the trip release mechanism taken on the line 9—9 of Figure 8;

Figure 10 is an enlarged side view of the card ejector, card receptacle, card elevator and card retainer guide;

Figure 11 is a plan view of the mechanism described in Figure 10 taken on the line 11—11 of Figure 10;

Figure 1:
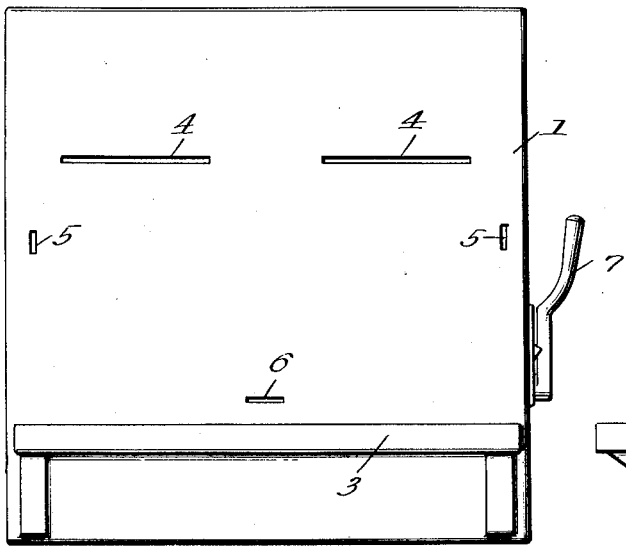
Figure 1 is a front view of the vending machine.
Figure 2:
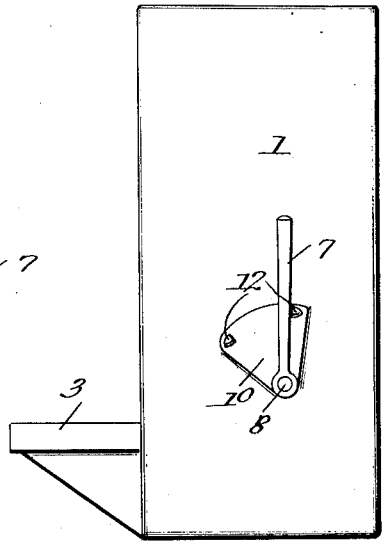
Figure 2 is a side view of the vending machine.
Figure 3:
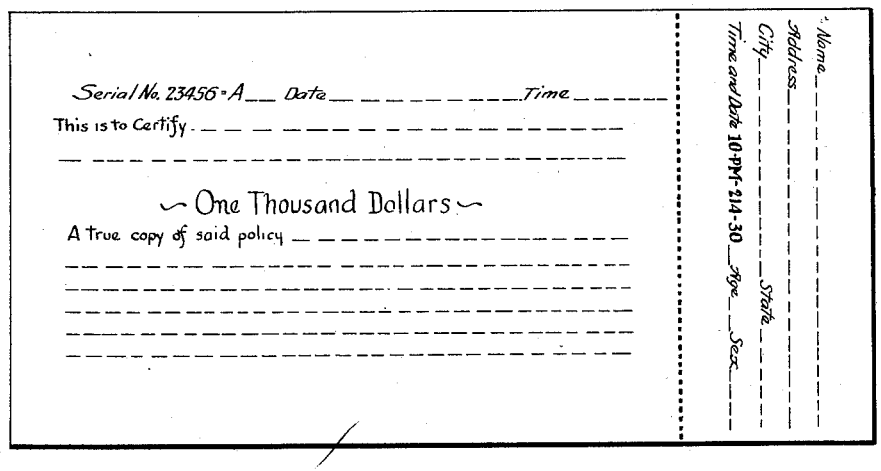
Figure 3 is a view of the card or certificate which, for the purpose of illustration, is an accident insurance premium certificate.

Referring more specifically to the drawings, in which like numbers indicate like parts, the machine upon which invention is predicated comprises a casing 1, having a removable back 2, and provided with a platform 3 on the front side thereof. The face of the casing contains longitudinal slots 4 near the top, vertical slots 5 on either side, and a smaller longitudinal slot 6, just above the platform 3. An operating handle 7 is provided at the right hand side when addressing the machine.

The arrangement of the casing and the positioning of the slots therein, above set forth, is merely illustrative of one embodiment of many which might be fabricated.

A shaft 8 extends between the sides of the casing and at one side protrudes through a bearing member 9, an aperture, and a quadrant 10 to accommodate the handle 7, and at the other side is rotatably secured within a bearing member 11. The quadrant 10 is provided with projections 12, which form stops when the handle is operated.

There are two separate mechanisms on either side of the vertical median line of the device, which are operated by the shaft 8. These mechanisms are identical in construction with the exception of the coin chutes, one being smaller to accommodate a coin of smaller denomination. In view of this, a description of one of the mechanisms will be sufficient to acquaint those skilled in the art with the entire construction of the device.

The coin operating mechanism comprises generally a male quadrant 13, which is attached to the shaft 8, and a female quadrant 14, which is attached to a sleeve 15 surrounding the shaft 8. The details of this mechanism, and its operation will be later more fully described. A bracket 16 supports a chute 17, the open end of which coincides with the vertical slot 5 in the face of the casing.

The card ejector lever 18 is secured at its lower end at 19 to the sleeve 15, and at its other end is pivotally connected to the card ejector link 20, said link being pivotally connected to the arm 21, attached to the card ejector 22.

Referring more particularly to Figures 5, 6, 10 and 11, the ejector 22 slides in guides 23 beneath and in contact with the card retainer guide 24. The end 25 of the card ejector is angled and shouldered to receive a card A in order to eject it through an opening between the ejector stop 26, positioned beneath the end of the card retainer guide 24 and the flange 27, and hence through the slot 4 in the face of the machine. It will be noted that the ejector stop 26 is shaped to receive the angled and shouldered end 25 of the ejector 22. A shutter 28 covers the opening between the said ejector stop and said flange to prevent insertion of anything back into the slot 4. An opening is provided in the card retainer guide 24 near the front end thereof at 29 through which the time dial mechanism 30 makes contact with the card A, and smaller openings 31 are provided on either side of opening 29 through which the ink ribbon 32 runs. In order to facilitate and direct travel of said ink ribbon above the ejector 22 and beneath the time dial mechanism 30, grooves 33 extend inwardly from the openings 31 to the larger opening 29.

A card receptacle 34 is positioned at the front of the casing and attached thereto by means of the bracket 35. The upper end of said receptacle extends into the flange 27, and it will be noted that the rear side of said receptacle is cut away to allow insertion and replenishment of the card supply between the said cut-away portion and the flange.

Within the card receptacle is an elevator comprising a platform 36, having a bracket 37 secured to the bottom thereof. Pivotally attached to the bracket 37, by means of pin 38, is a yoke 39, which extends on either side of the pivot point beyond the sides of the card retainer guide 24. The card receptacle 34 is provided on its sides with pockets 40 running the entire length of the receptacle to accommodate the extended ends of the yoke.

Mounted upon and at the sides of the card retainer guide 24 are brackets 41 and 42, carrying at their ends bearings 43, in which is held a shaft 44. At either end of said shaft are secured grooved wheels 45. A collar 46 surrounds and is attached to the shaft, and a coil spring 47 is secured to said collar and to the bearing member on bracket 41. A wire 48 runs in each of the grooved wheels 45, and at one end is attached in the groove and at the other end to the adjusting screws 49 at the ends of the yoke 39. As the elevator platform 36 is forced downwardly, when the card receptacle is filled with cards, the coil spring 47 is so tensioned that the elevator platform with cards thereon will push upwardly at all times with a uniform pressure against the card retainer guide 24.

The bracket 42 has attached thereto at its lower enlarged portion a bearing 50 which supports a shaft carrying an ink ribbon spool 51. A spring 52 is interposed between the bearing and the spool to maintain the spool under the proper tension. An arm 53 extends from the upper portion of the bracket 42 to which is attached a shaft carrying a ratchet wheel 54 and a second ribbon spool 55. Knobs 56 are provided on each of the ribbon spools to facilitate rewinding of the ink ribbon when necessary. An after-pawl is provided at 57 for the said ratchet wheel. A link 58 has attached at one end a pawl 59 and an arm 60 by means of a screw bolt 61. Referring more particularly to Figures 7, 8 and 9, the arm 60 forms the upper release trip, and is attached at its upper end to a spring 62 secured to the top of the casing and extends downwardly into a guide member 63 attached to the side of the card receptacle 34. An arm 64 forms the lower release trip, and extends upwardly into the guide member 63, and has at its lower end an elongated aperture 65 in which moves a pin 66 secured at the end of a lever 67 attached to the collar 68, which is mounted upon and actuated by the sleeve 15. The lower end of the arm 60 is shaped to form a latch member 60', and the upper end of the arm 64 is shaped to form a latch member 64'. The said latch members are normally in operative connection with each other.

A pin 69 is positioned adjacent the extreme lower end of and in contact with the latch member 60'. A release trip spring 70 is secured within the guide member 63, and presses against the latch member 60'. Connected to the arm 60 by any suitable means, such as extensions 71, is the time dial mechanism 30.

Between the two mechanisms on either side of the casing is set a clock mechanism 72 supported by a platform 73. A clock shaft 74 is supported by a bearing member 75 attached to the front end of the casing. Loosely surrounding the clock shaft are complementary brackets 76 having extensions 77 and 78 attached to the time dial mechanisms. Arms 79 having bearings at their outer ends, project from the brackets 76 to accommodate shafts 80 provided with gear wheels 81, which mesh with the gear wheel 82 mounted on the said clock shaft. The shafts 80 extend to the time dial mechanism where they are held by arms 83 projecting from extensions 77 and 78. The arms 83 are provided with bearing members which hold shafts 80, and gear wheels 84 secured to said shafts mesh with the gear wheels 85 attached to shafts from the time dial mechanisms.

To the winding shaft of the clock is secured a key 86. A spring 87 is secured in any suitable manner to the end of the key and to the top of the casing, and a second spring 88 is secured to the end of the key and to the lever 89 on the shaft 8.

Arms 90 extending from the chute support 16 pivotally support a pin 91 to which is attached a coin slot shutter 92. An arm 93 in operative connection with the shutter 92 is provided with a hook 94, which will drop through an aperture 95 in the card retainer guide 24 when the card receptacle 34 is empty, and, in so doing, move the shutter 92 between the open end of the coin chute 17 and the slot 5 in the face of the casing.

Figures 12, 13:
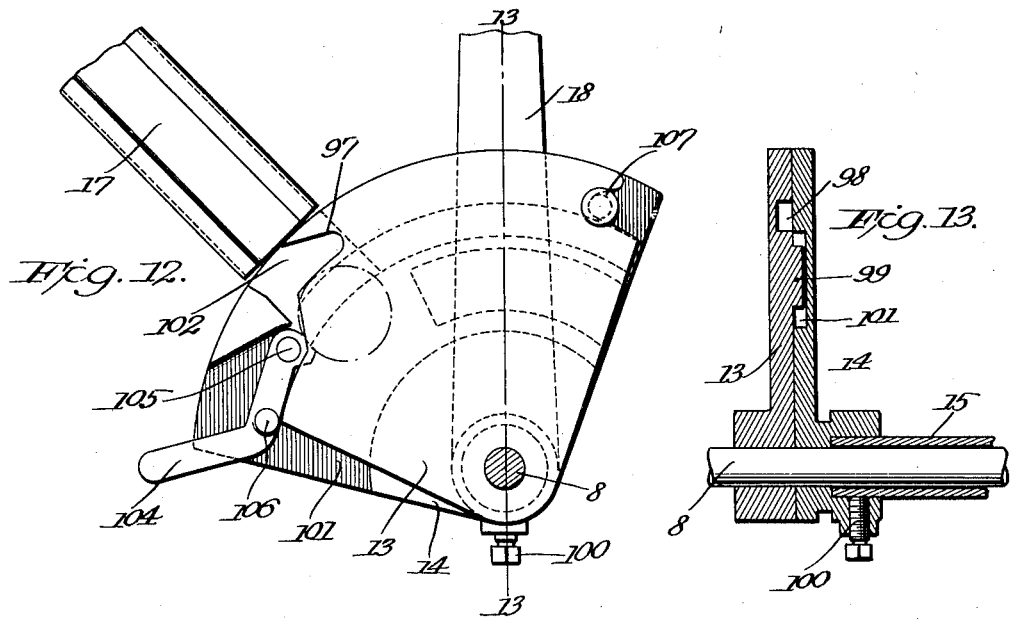
Figure 12 is an enlarged side view of the coin operating mechanism.
Figure 13 is an enlarged end view of the coin operating mechanism.
Figures 14, 15:
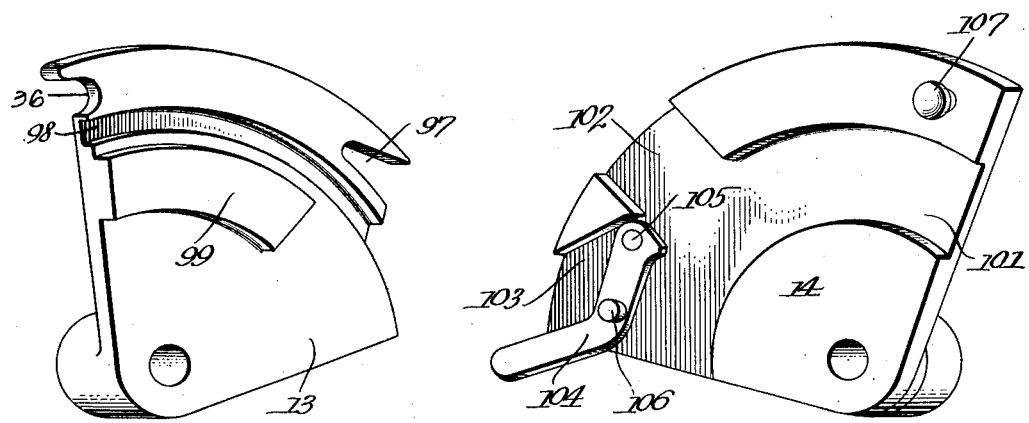
Figure 14 is an elevation of the male quadrant of the coin operating mechanism.
Figure 15 is an elevation of the female quadrant of the coin operating mechanism.

Referring more particularly to Figures 12, 13, 14 and 15, the coin operating mechanism, heretofore generally described, consists of a male quadrant 13 and a female quadrant 14. The quadrant 13 is operatively connected to the shaft 8, and is provided with notches 96 and 97 in the ends thereof near the top. A semi-circular groove 98 runs the width of the quadrant beneath the said notches, and below the groove is a semi-circular projection 99.

Quadrant 14 is operatively connected to the sleeve 15 by means of the screw bolt 100, and is provided with a semi-circular groove 101 into which opens a slot 102. At one side of the quadrant the portion above the groove is cutaway at 103. A trigger 104 is pivotally mounted at 105 and is provided with a pin 106 substantially at the elbow of the trigger. A pin 107 is positioned on the upper portion of the quadrant 14 at opposite sides from the trigger. The lower end of the coin chute 17 opens into the slot 102.

In the bottom of the casing 1 are placed a central receptacle C and smaller receptacles D on either sides thereof, the former receiving the returned stubs of the cards or certificates, and the latter receiving the coins B.

The operation and function of the mechanisms above described are as follows: A coin B of the proper denomination is deposited in one of the slots 5, and descends down the chute 17 through slot 102 into groove 101 of the coin operating mechanism. The handle 7 is then pulled toward the operator and projection 99 on the male quadrant 13, strikes the coin which contacts with the trigger 104 moving it outwardly on its pivot point 105, so that the pin 106 is in the path of and becomes locked in notch 97. The shaft 8 and sleeve 15 are then in operative connection with each other. As the shaft and sleeve rotate their predetermined distance, the lever 67 will actuate the arm 64, forming the lower release trip which will pull downwardly on the arm 60, forming the upper release trip. In so doing, the time dial mechanism connected to arm 60 by extensions 71, will be forced through the opening 29 of the card retainer guide 24, and press against the ink ribbon 32 and card A, thereby properly stamping the desired data on said card. As the card is stamped, the card ejector 22 will be actuated by the ejector lever 18, and the card will be pushed out of the slot 4.

As the downward movement of the release trip mechanism progresses, the latch member 60' will be disconnected from the latch member 64' by means of the pin 69. This will cause a return movement of the parts by means of the spring 62, attached to the arm 60, and the pawl 59 will actuate the ratchet wheel 54 and the ink ribbon spool 55 will rotate, thereby placing a fresh strip of ink ribbon beneath the time dial mechanism. The shaft 8 will be returned to its normal position by means of the springs 87 and 88, and quadrant 13 with notch 96 engaging pin 107 on quadrant 14, will rotate sleeve 15 and the parts actuated thereby to their normal positions.

A new card will be placed in position to be ejected by means of the elevator platform 36, which is pulled upwardly through the tension of spring 47, grooved wheels 45, wires 48, and yoke 39. It will be noted that yoke 39 is pivotally attached to the platform 36 to facilitate self-adjustment of said platform and cards within the card receptacle 34 and prevent any possibility of jamming.

Whenever the handle 7 is actuated, regardless of whether a coin has been deposited, the spring 88, with its end attached to the key 86 and to the lever 89, will pull downwardly on said key to wind the clock spring. When the clock spring is sufficiently wound, the tension thereof, together with the tension of spring 87 attached to the key and to the top of the casing, will overcome the tension of the spring 88.

The clock mechanism is of the ordinary type adapted for the purpose set forth, and is in operative connection with the time dial mechanisms by means of the shafts 74 and 80 and gear wheels 81, 82, 84, and 85. The complementary brackets 76 with extensions 77 and 78 are loosely supported by the clock shaft to allow the time dial mechanisms to move up and down in order to stamp the cards.

The time dial mechanisms are of the ordinary type for the purposes set forth and, in the instance here illustrated in connection with accident insurance policy premium certificates, it stamps the date and time of making application for insurance protection.

When the card receptacle is exhausted, the arm 93 with hook member 94, will drop into an aperture 95 in the card retainer guide 24, and coin slot shutter 92 will move between the coin slot 5 and the coin chute 17, thereby preventing further insertion of coins through said slot.

The card A used in the illustration of the vending machine here set forth, comprises a main portion and a stub portion. When the card with proper time and date stamped thereon has been ejected through slots 4, the applicant for insurance protection detaches the stub, places thereon the data requested, such as name, address, age and sex, and returns the stub into the casing through slot 6. The applicant retains the main portion of the card as a receipt or certificate showing that application has been made and accepted for insurance protection. As a novelty and a matter of convenience, the reverse side of the card A is the usual postal card type in order that the insured may send the receipt or certificate to the beneficiary together with personal greetings or information.

Upon the face of the casing and on the platform, there may be set forth, if desired, information explaining the purposes of the vending machine.

It is obvious that I have invented a greatly improved vending machine which is simple, yet efficient in operation and inexpensive to manufacture. The device may be put to many purposes and advantages, and it is clearly understood that the form of the vending machine here described is subject to various modifications without departing from the spirit and scope of the appended claims.

I claim:

1. In a vending machine, the combination of a casing, a receptacle for cards, an operating shaft, a card printing mechanism, a card ejector, an elevator within said receptacle, means in operative connection with said shaft to actuate said printing mechanism, means in operative connection with said shaft to actuate said ejector, coin controlled means to position the parts for operation, and means to exert an upward pull on said elevator.

2. In a vending machine, the combination of a casing, a receptacle for cards, an operating shaft, a card printing mechanism, a card ejector, a self-adjusting elevator within said receptacle, means in operative connection with said shaft to actuate said printing mechanism, means in operative connection with said shaft to actuate said ejector, coin controlled means to position the parts for operation, and means to exert an upward pull on said elevator.

3. In a vending machine, the combination of a casing, a receptacle for cards, an operating shaft, a card printing mechanism, a card ejector, an elevator within said receptacle comprising a platform having a yoke pivotally connected thereto, means in operative connection with said shaft to actuate said printing mechanism, means in operative connection with said shaft to actuate said ejector, coin controlled means to position the parts for operation, and means to exert an upward pull on said elevator.

4. In a vending machine, the combination of a casing, a receptacle for cards, an operating shaft, a card printing mechanism, a card ejector, an elevator within said receptacle comprising a platform having a yoke pivotally connected thereto, means in operative connection with said shaft to actuate said printing mechanism, means in operative connection with said shaft to actuate said ejector, coin controlled means to position the parts for operation, brackets positioned above said elevator, a shaft mounted in said brackets, wheels attached to said shaft, cables engaging said wheels and secured to said elevator, and means to impart a rotative movement to said shaft.

5. In a vending machine, the combination of a casing, a receptacle for cards, an operating shaft, a card printing mechanism, a card ejector, an elevator within said receptacle comprising a platform having a yoke pivotally connected thereto, means in operative connection with said shaft to actuate said ejector, coin controlled means to position the parts for operation, brackets positioned above said elevator, a shaft mounted in said brackets, grooved wheels attached to said shaft, cables in said grooves and secured to said elevator, and a spring secured to said shaft and to one of said brackets to impart a rotative movement to said shaft.

6. In a vending machine, the combination of a casing, a receptacle for cards, an operating shaft, a card printing mechanism, a card ejector comprising a flange adjacent said receptacle, a platform spaced thereabove, and a movable member between said flange and platform, means to present a card to said printing mechanism, means in operative connection with said shaft to actuate said printing mechanism, coin controlled means to position the parts for operation, and means in operative connection with said shaft and connected to said movable member to actuate said movable member.

7. In a vending machine, the combination of a casing, a receptacle for cards, an operating shaft, a card ejector comprising a flange adjacent said receptacle, a platform spaced thereabove having apertures therein to accommodate said printing mechanism, and a movable member between said flange and platform, means to present a card to said printing mechanism, means in operative connection with said shaft to actuate said printing mechanism, coin controlled means to position the parts for operation, and means in operative connection with said shaft and connected to said movable member to actuate said movable member.

8. In a vending machine, the combination of a casing, a receptacle for cards, an operating shaft, a card printing mechanism, a card ejector comprising a flange adjacent said receptacle, a platform spaced thereabove having apertures therein to accommodate said printing mechanism, and a movable member between said flange and platform, means to present a card to said printing mechanism, means in operative connection with said shaft to actuate said printing mechanism, coin controlled means to position the parts for operation, means in operative connection with said shaft and connected to said movable member to actuate said movable member, and a stop member between the front ends of said flange and platform to limit the movement of said movable member.

9. In a vending machine, the combination of a casing, a receptacle for cards, an operating shaft, a card ejector comprising a flange adjacent said receptacle, a platform spaced thereabove having apertures therein, and a movable member between said flange and platform, brackets mounted on said platform, spools having an ink ribbon therebetween attached to one of said brackets, a printing dial positioned above said platform, means to position a card within said card ejector, means in operative connection with said shaft and connected to said movable member to actuate said movable member, and means in operative connection with said shaft to move said printing dial against said card.

10. In a vending machine, the combination of a casing, a receptacle for cards, an operating shaft, a card ejector comprising a flange adjacent said receptacle, a platform spaced thereabove having apertures therein, and a movable member between said flange and platform, brackets mounted on said platform, spools having an ink ribbon therebetween attached to one of said brackets, a printing dial positioned above said platform, means to position a card within said card ejector, means in operative connection with said shaft and connected to said movable member to actuate said movable member, means in operative connection with said shaft to move said printing dial against said card, and means to rotate one of said ink ribbon spools.

11. In a vending machine, the combination of a casing, a receptacle for cards, an operating shaft, a card ejector comprising a flange adjacent said receptacle, a platform spaced thereabove having apertures therein, and a movable member between said flange and platform, brackets mounted on said platform, spools having an ink ribbon therebetween attached to one of said brackets, a printing dial positioned above said platform, means to position a card within said card ejector, means in operative connection with said shaft and connected to said movable member to actuate said movable member, and a trip mechanism in operative connection with said shaft to move said printing dial against said card.

12. In a vending machine, the combination of a casing, a receptacle for cards, an operating shaft, a card ejector comprising a flange adjacent said receptacle, a platform spaced thereabove having apertures therein, and a movable member between said flange and platform, brackets mounted on said platform, spools having an ink ribbon therebetween attached to one of said brackets, a printing dial positioned above said platform, means to position a card within said card ejector, means in operative connection with said shaft and connected to said movable member to actuate said movable member, a trip mechanism in operative connection with said shaft to move said printing dial against said card, and means to return said printing dial to its inoperative position.

13. In a vending machine, the combination of a casing, a receptacle for cards, an operating shaft, a card ejector comprising a flange adjacent said receptacle, a platform spaced thereabove having apertures therein, and a movable member between said flange and platform, brackets mounted on said platform, spools having an ink ribbon therebetween attached to one of said brackets, a printing dial positioned above said platform, means to position a card within said card ejector, means in operative connection with said shaft and connected to said movable member to actuate said movable member, and means in operative connection with said shaft to move said printing dial into one of said apertures in said platform, said ink ribbon being beneath said printing dial.

JOSEPH F. DRUMMOND.